UNITED STATES PATENT OFFICE.

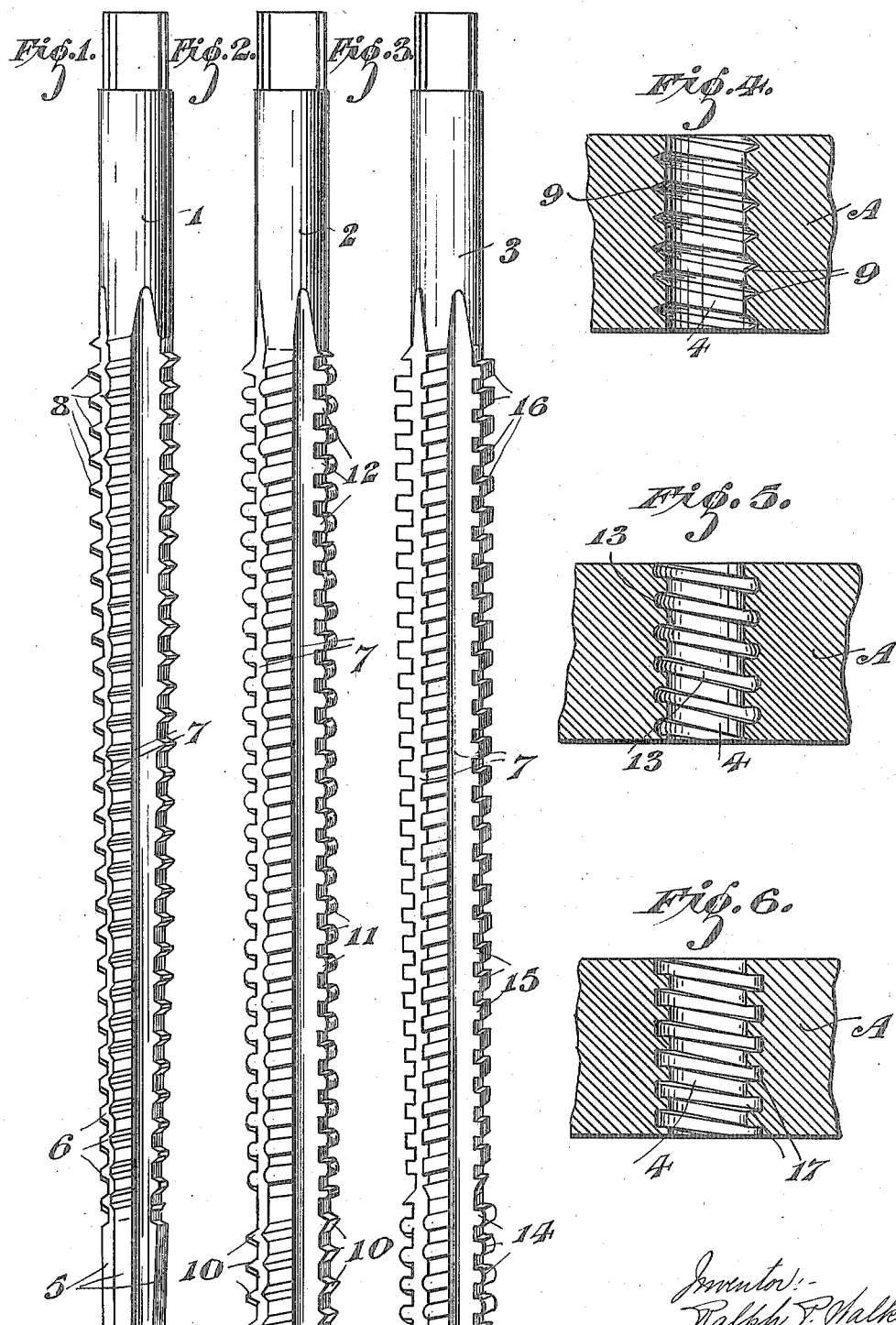

RALPH PERCY WALKER, OF BIRMINGHAM, ENGLAND.

PROCESS OF AND MEANS FOR TAPPING SCREW-THREADS.

1,249,697.   Specification of Letters Patent.   Patented Dec. 11, 1917.

Application filed January 12, 1915. Serial No. 1,751.

*To all whom it may concern:*

Be it known that I, RALPH PERCY WALKER, a subject of the Kingdom of Great Britain, residing at Bath street and Whittall street, Birmingham, in the county of Warwick, England, manufacturer, have invented a certain new or Improved Process of and Means for Tapping Screw-Threads, of which the following is a specification.

This invention comprises a new or improved process of and means for tapping screw threads, and relates to the tapping of internal square threads, i. e., screw threads which are square or rectangular in cross section, and also threads having inclined sides and flat bases, the invention having for its object to furnish means whereby such square tapping may be produced or formed in a particularly satisfactory and more expeditious manner than heretofore, the amount of operations necessitated in such production being by this invention reduced.

According to the present invention the tapping of internal square threads is accomplished by first forming in the metal member to be tapped a thread of V or substantially V shape in cross section and afterward gradually cutting said V to the desired section of the required size.

In the production of square threads the process is accomplished advantageously by three operations. The first operation is effected by means of a tap or cutting tool having cuttting teeth which at the commencement are of flat-topped conical section and gradually increase in height and merge into V or substantially V shaped teeth, thereby producing an internal thread or tapping of a corresponding V section. The second operation is effected by a second tap having teeth of rectangular or substantially rectangular section having rounded or convex tops or outer faces, said teeth being gradually increased in height to the finishing extremity of the tool thereby, converting the already formed V tapping into a rectangular or substantially rectangular shape with rounded or concave base. The third operation is effected by a third tap having rectangular or square teeth of gradually increasing height so as to cut the threads to square section thereby producing the finished square tapping required.

When it is desired to produce a finished thread having inclined sides, the sides of the cutting teeth, of the second and third tap, instead of being perpendicular, slope or incline to a suitable degree.

In order that this invention may be clearly understood and more readily carried into practice, reference may be had to the appended explanatory sheet of drawings upon which:—

Figures 1, 2 and 3 show in elevation three taps adapted when used consecutively in the order illustrated to produce internal square screw threads.

Fig. 4 is a sectional view showing the nature of thread produced by the operation of the first tap shown in Fig. 1.

Fig. 5 is a sectional view showing the nature of thread produced by the operation of first two taps shown in Figs. 1 and 2.

Fig. 6 is a sectional view showing the finished thread produced by the operation of the three taps.

In a convenient embodiment of this invention the metal blank or member A to be tapped is furnished with a suitable boring or aperture 4, and the cutting tool or tap 1 for effecting the first operation is of tapering formation the diameter being less at its commencing extremity. At this commencing extremity a suitable portion of the tool is conveniently made in the form of a reamer having four or other suitable number of longitudinal cutting ridges 5 thereon for boring out the aperture 4 to a suitable diameter to receive the first of the cutting teeth 6 on said tool 1. These cutting teeth 6 are arranged in the usual manner in a screw formation upon the tool 1 and are formed with cutting edges by providing four or other suitable number of longitudinal flutings 7 along the tool said teeth 6 being at the commencing extremity of the tool of conical or V shaped formation having the apex or top of the V flattened, said flat-topped conical teeth being increased in height toward the finishing extremity of the tool 1 at which extremity the teeth are of V or substantially V shape in cross section, the amount removed from the apices or tops of the teeth being gradually diminished to the finished extremity of the tool. The diameter of the tool 1 is gradually increased until the diameter or substantially the diameter of the required tapping is reached, which diameter is advantageously reached a short distance from the finishing extremity or part of the tool 1 so as to furnish a series or suitable number of teeth 8 at such extremity which are parallel. These parallelly arranged teeth are of V shaped formation and may if desired have their apices rounded off to a suitable degree, and for the purpose of this portion of the tool having parallelly disposed teeth is to enable the tapping formed by the first operation to be of equal diameter and have threads 9 of equal size and formation throughout its length, as shown in Fig. 4.

For the second operation of the tapping a tool 2 is employed having at its commencing extremity a series or number of parallelly disposed cutter teeth 10 of similar formation and size to those 8 at the finishing extremity of the first tool 1, which preliminary series of teeth 10 are caused to engage with or fit into the V or substantially V shaped tapping already formed so as to form an effective guide for the commencing cutter teeth proper 11 of the second tool 2.

The cutting teeth on this second tool 2 are at their commencement of rectangular or substantially rectangular section having rounded or convex tops or outer faces, said teeth being comparatively low or flat at the commencing extremity and gradually increasing in height to the finishing extremity of the tool at which extremity a series or suitable number of parallelly disposed teeth are arranged as before described with reference to the first tool, the finished teeth 12 on the second tool being of substantially rectangular formation with rounded or convex tops. In operation the commencing cutter teeth of the second tool 2 has the effect of cutting out from each side of the already formed V tapping at or near the widest portion of same a small angular portion thereby forming the base or mouth of the V tapping to a rectangular or oblong formation, the gradually increasing height of the following-up cutter teeth on the tool having the effect of gradually widening the upper part or apex of the V tap by cutting away the sides of same, the result being that after the operation by the second tool a tapping 13 is produced which is of substantially square or rectangular formation having a rounded or concave channel base as shown in Fig. 5.

To effect the third and final operation a series or number of guide teeth 14 are arranged at the commencing extremity of the third tool 3 advantageously of a similar size and formation to those marked 12 at the finishing part of the second tool 2.

At the commencement of the cutting or operating portion of this third tool 3 the cutter teeth 15 are of rectangular or square section less in height than the total height of the finishing teeth 12 of the second tool, and the height or external diameter of these rectangular cutting teeth 15 gradually increases toward the finishing part of said third tool 3, a suitable number or series 16 of the last or finishing teeth being parallelly arranged as is the case in the first and second tools, said finishing teeth or series of teeth 16 being of the exact size and formation of the square tapping 17 to be produced.

It will thereby be seen that a square tapping can be produced according to this invention by only three operations and in a very expeditious and efficient manner.

In the production of a finished thread having inclined sides, the cutting teeth on the second tap 2 would advantageously have sloping or inclined side faces, as differentiated from sides which are at right angles to the axis of the tap, said teeth being somewhat broader at the base than at the top, and the sides of the cutter teeth on the third tap 3 would also be suitably inclined, the finishing cutter teeth 16 being in this case of substantially conical formation with flat tops.

The series or number of guide teeth 10 and 14 at the beginning of the second and third tools 2 and 3 have the effect of guiding the cutting teeth proper exactly into the position of the tapping already formed thereby effectively obviating the formation of any irregularity in the tapping, and at the same time furnishing means for positioning the tool in exact axial alinement with the tapping. The number of guide teeth furnished is such that by the time the last of said guide teeth has passed out from the tapping, the following-up cutter teeth proper are in engagement with the major part of said tapping.

If desired a short portion of the tool between the last of the guide teeth or part and the first of the cutter teeth may be turned plain free from teeth or projections.

The length of the cutting tools may be varied as desired, and the diameter of same determined according to the diameter of tapping required.

The cutting teeth upon the tools may advantageously be arranged in four longitudinal rows, or series by forming four longitudinal flutings 7.

What I claim as my invention and desire to secure by Letters Patent is:—

1. A process for tapping internal screw threads consisting first in making an internal tapping of V shape, in subsequently producing a substantially cylindrical portion at the apex of the thread and at the base of the groove between the threads and in finally deepening such groove.

2. A process for tapping internal screw threads consisting in first making an internal tapping of V shape and having the base of the groove between the threads parallel to the longitudinal axis of the tapping, in subsequently producing the subtantially cylindrical portion at the apex of the thread and in finally deepening such groove.

3. A process for tapping internal screw threads having a root line of material length as compared with the depth of cut, in which the thread is produced by means of a series of taps, the first tap having cutting teeth which, at the commencement are low and flat topped, gradually increasing in height and merging into substantially V-shaped teeth so as to produce an internal tapping of corresponding V-section, the second tap having cutting teeth of substantially rectangular section with rounding tops gradually increasing in height so as to convert the tapping into rectangular section with rounded base, the third tap having rectangular teeth of gradually increasing height so as to produce the finished square tapping.

4. A process for tapping internal screw threads having inclined sides, in which the thread is produced by means of a series of taps, the first tap having cutting teeth which, at the commencement are low and flat topped, gradually increasing in height and merging into substantially V-shaped teeth so as to produce an internal tapping of corresponding V-section, the second tap having cutting teeth with inclined sides and rounded tops gradually increasing in height so as to convert the tapping into a thread having inclined sides and rounded base, the third tap being furnished with cutting teeth having inclined sides and flat tops, said teeth gradually increasing in height so as to produce the finished tapping.

In witness whereof I have hereunto set my hand in the presence of two witnesses.

RALPH PERCY WALKER.

Witnesses:
 ARTHUR HENRY BROWN,
 CHARLES R. RIGBY.